US006671318B2

(12) United States Patent
Gobert

(10) Patent No.: US 6,671,318 B2
(45) Date of Patent: Dec. 30, 2003

(54) DETERMINING THE DEGREE OF RESEMBLANCE BETWEEN A DATA SAMPLE AND INTERPOLATIONS OF OTHER DATA SAMPLES

(75) Inventor: Jean Gobert, Maisons Alfort (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 469 days.

(21) Appl. No.: 09/829,790

(22) Filed: Apr. 10, 2001

(65) Prior Publication Data

US 2001/0028680 A1 Oct. 11, 2001

(30) Foreign Application Priority Data

Apr. 11, 2000 (EP) .............................................. 00401003

(51) Int. Cl.$^7$ .......................... H04N 7/12; H04N 11/02; H04N 11/04
(52) U.S. Cl. .............................. 375/240.01; 375/240.01
(58) Field of Search ....................... 375/240.01, 240.03, 375/240.12, 240.16, 240.17, 240.24, 240.2; 348/400–403, 405, 407, 415; H04N 7/12, 11/02, 11/04

(56) References Cited

U.S. PATENT DOCUMENTS

| | | | |
|---|---|---|---|
| 5,652,629 A | * 7/1997 | Gonzales et al. | ............ 348/699 |
| 5,684,538 A | * 11/1997 | Nakaya et al. | ......... 375/240.17 |
| 5,812,788 A | * 9/1998 | Agarwal | ...................... 709/247 |
| 6,134,352 A | * 10/2000 | Radha et al. | ................ 382/254 |
| 6,414,992 B1 | * 7/2002 | Sriram et al. | .......... 375/240.13 |
| 6,546,117 B1 | * 4/2003 | Sun et al. | .................... 382/103 |

FOREIGN PATENT DOCUMENTS

GB    2311435 A    9/1997    ............ H04N/7/36

* cited by examiner

Primary Examiner—Nhon Diep

(57) ABSTRACT

Video encoding with half-pixel motion estimation is an example of a data processing in which the degree of resemblance between a data sample [X] and interpolations [I] between another data sample [C] and further data samples [B] is determined for each interpolation [I]. The interpolations [I] are the sum of the other data sample [C] multiplied by a first weighting factor [W1] and a further data sample [B] multiplied by a second weighting factor [W2], expressed in a formula:

$$I = C \times W1 + B \times W2.$$

4 Claims, 4 Drawing Sheets

DETERMINING THE DEGREE OF RESEMBLANCE BETWEEN A DATA SAMPLE AND INTERPOLATIONS OF OTHER DATA SAMPLES

The invention relates to data processing in which the degree of resemblance between a data sample and interpolations between another data sample and further data samples is determined for each interpolation. The invention may be applied in, for example, video encoding that employs half-pixel motion estimation.

It is possible to determine the degree of resemblance between a data sample and interpolations between another data sample and further data samples in the following manner. In a first step, the interpolations are calculated. For example, an interpolation may be the other data sample multiplied by a first weighting factor and a further data sample multiplied by a second weighting factor. In a second step, differences between the data sample and the interpolations are calculated for each interpolation. It seems that the United Kingdom patent application published under number 2 311 435 describes a half-pixel motion estimation in accordance with this method.

It is an object of the invention to enable a cost reduction to be achieved.

In accordance with the invention, the degree of resemblance between a data sample and interpolations of another data sample with further data samples is determined in the following manner. In a preliminary calculation step a common portion is calculated. The common portion is K multiplied by the difference between the data sample and the other data sample multiplied by the first weighting factor, K being the inverse of the second weighting factor. In a further calculation step differences are calculated between the common portion and the respective further data samples. Each difference corresponds to the degree of resemblance between the data sample and the relevant interpolation.

The invention takes the following aspects into consideration. The greater the number of arithmetic operations a method comprises, the higher the cost to implement that method. For example, each arithmetic operation may be implemented by means of a specific item of hardware. If the method comprises relatively many arithmetic operations, its implementation will comprise relatively many items of hardware. The method may also be implemented by means of a single item of hardware: a processor that is programmed to carry out the method. In many applications the method should be carried out within a certain time limit. The processor will need to be relatively fast if the method comprises relatively many arithmetic operations. The faster a processor is, the more expensive the processor will be.

The prior-art method requires the following arithmetic operations. In principle, each interpolation involves at least two multiplications and one addition. There is one exception: if the weighting factors are both 0.5, one addition and one division by two will be sufficient. It requires one subtraction to calculate the difference between the relevant data sample and an interpolation. Supposing that there are N different interpolations, N being an integer, this means that 2N multiplications, N additions and N subtractions are required. If the weighting factors are both 0.5, N additions, N divisions and N subtractions will be sufficient.

The method in accordance with the invention requires the following arithmetic operations. In principle, the preliminary calculation step involves two multiplications and one subtraction. There is one exception: if the weighting factors are both 0.5, one multiplication and one addition will be sufficient. The further calculation step involves a subtraction for each interpolation. Supposing that there are N different interpolations, this means that two multiplications and N+1 subtractions are required. If the weighting factors are both 0.5, one multiplication and N+1 subtractions will be sufficient. Consequently, the method in accordance with the invention requires fewer arithmetic operations than the prior-art method. Consequently, the invention allows a cost reduction to be achieved.

These and other aspects of the invention will be described in greater detail hereinafter with reference to drawings.

The following remarks relate to reference signs. Like entities are designated by like letter references in all the FIGS. Several similar entities may appear in a single Figure. In that case, a digit or a suffix is added to the letter reference in order to distinguish between like entities. The digit or the suffix may be omitted for convenience or it may be replaced by an asterisk in the case that its value is not important (do not care value). This applies to the description as well as the claims.

Figure 1:
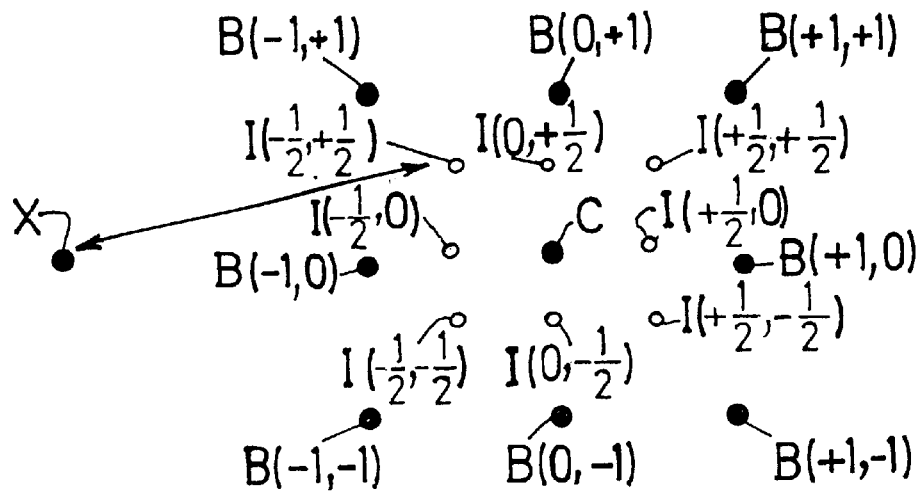
FIG. 1 is a conceptual diagram illustrating basic features of the invention described hereinbefore.

FIG. 1 illustrates basic features of the invention described hereinbefore. The degree of resemblance between a data sample [X] and interpolations [I] of another data sample [C] with still other data samples [B] is determined for each interpolation [I]. The interpolations [I] are the sum of the other data sample [C] multiplied by a first weighting factor [W1] and a further data sample [B] multiplied by a second weighting factor [W2], expressed in a formula:

$$I = C \times W1 + B \times W2.$$

In a preliminary calculation step [PCS] a common portion [Y] is calculated. The common portion [Y] is the inverse of the second weighting factor [W2] multiplied by the difference between the data sample [X] and the other data sample [C] multiplied by the first weighting factor [W1]. In formula:

$$Y = 1/W2 \times \{X - C \times W1\}.$$

In a further calculation step [FCS] differences [ER] are calculated between the common portion [Y] and the respective further data samples [B], expressed in a formula:

$$ER = Y - B.$$

Each difference [ER] corresponds to the degree of resemblance between the data sample [X] and the relevant interpolation [I].

The features illustrated in FIG. 1 may be applied in, for example, video encoding that employs half-pixel motion estimation. For example, a video encoding in accordance with a standard defined by the Moving Pictures Expert Group (MPEG) may employ half-pixel motion estimation. Half-pixel motion estimation provides motion vectors with half-pixel precision. Such motion vectors allow a better picture quality to be obtained at a decoding end.

Figure 2:
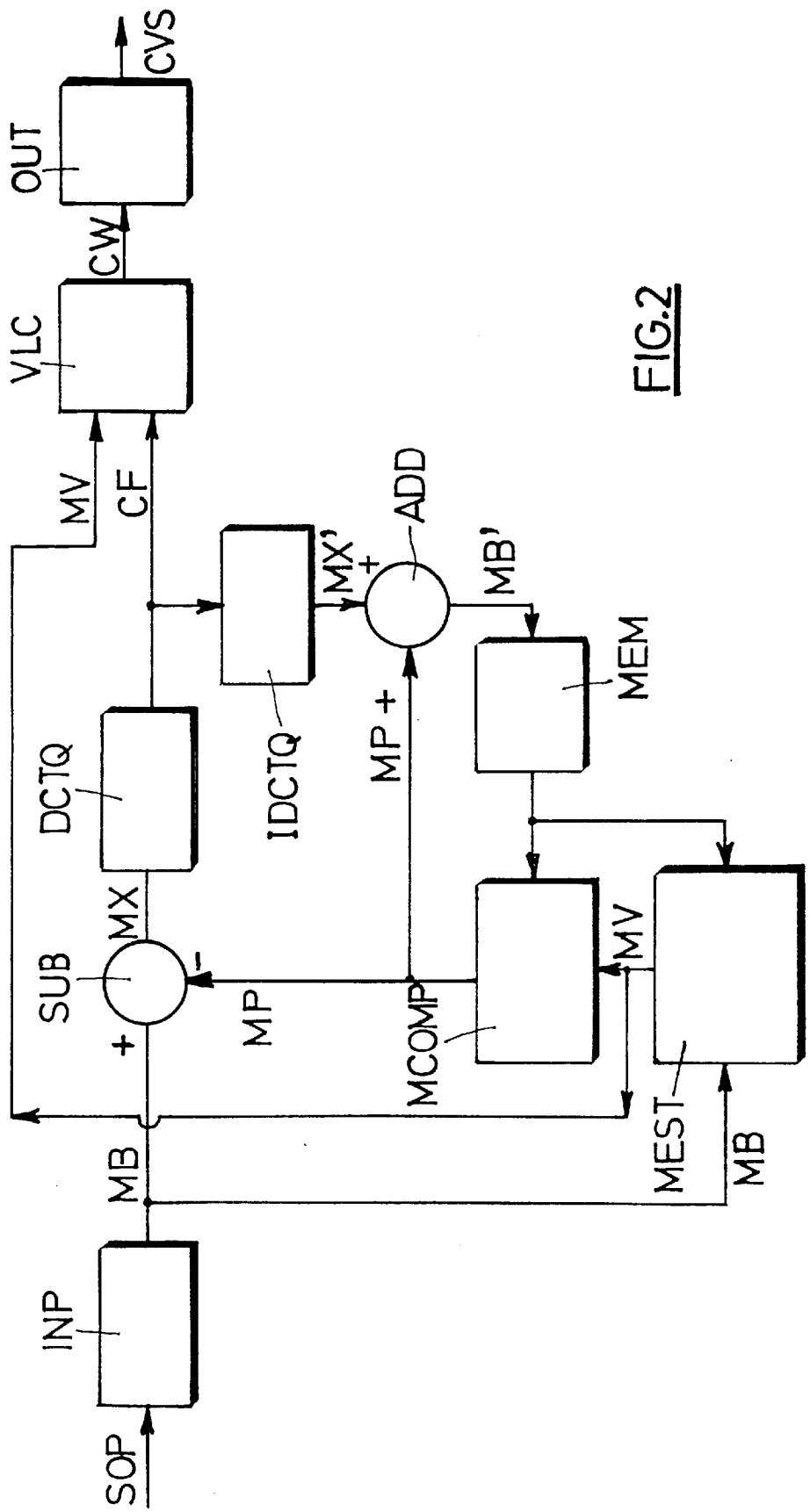
FIG. 2 is a block diagram illustrating an MPEG encoder that includes a motion estimator.

FIG. 2 illustrates an MPEG video encoder. The MPEG video encoder receives a sequence of pictures [SOP]. In response, it provides an encoded video data stream [CVS]. The video encoder comprises an input circuit [INP], a motion estimator [MEST], a motion compensator [MCOMP], a subtractor [SUB], a discrete cosine transformer and quantizer [DCTQ], an inverse discrete cosine transformer and quantizer [IDCTQ], an adder [ADD], a memory [MEM], a variable-length encoder [VLC] and an output circuit [OUT].

The MPEG video encoder basically operates as follows. The input circuit [INP] divides, in effect, a picture to be encoded into blocks of pixels [MB]. A block of pixels [MB] can be encoded in the following manner. The motion estimator [MEST] determines one or more motion vectors [MV] for the block of pixels. The motion compensator [MCOMP] determines a motion-compensated block of pixels [MP] on the basis of the motion vector [MV] and a picture already encoded and stored in the memory [MEM]. The subtractor [SUB] subtracts the motion-compensated block of pixels [MP] from the block of pixels [MB] to be encoded. Accordingly, a block of error-pixels [MX] is obtained.

The discrete cosine transformer and quantizer [DCTQ] applies a chain of processing steps to the block of error-pixels [MX]. These processing steps include a discrete cosine transformation and a quantization. Accordingly, a block of quantized coefficients [CF] is obtained. The variable-length decoder [VLC] transforms the block of quantized coefficients [CF] and the motion vectors [MV] into variable-length code words [CW]. The output circuit [OUT] adds some other data to these variable-length code words and casts the various types type of data into a format that is in accordance with the MPEG standard. Accordingly, the encoded video data stream [CVS] is obtained.

The block of pixels [MB] that has been encoded may belong to a picture that will serve a basis for encoding a subsequent picture. In that case, the block of quantized coefficients [CF] is applied to the inverse discrete cosine transformer and quantizer [IDCTQ]. The inverse discrete cosine transformer and quantizer [IDCTQ] applies a chain of processing steps to the block of quantized coefficients [CF] that is functionally the inverse of the chain of processing steps applied by discrete cosine transformer and quantizer [DCTQ]. Accordingly, a decoded block of error-pixels [MX'] will be obtained. The adder [ADD] adds the decoded block of error-pixels [MX'] to the motion-compensated block of pixels [MP] so as to obtain a decoded block of pixels [MB']. The decoded block of pixels [MB'] is stored in the memory [MEM] so that it can later be used for encoding another picture by means of motion estimation and compensation.

Figure 3:
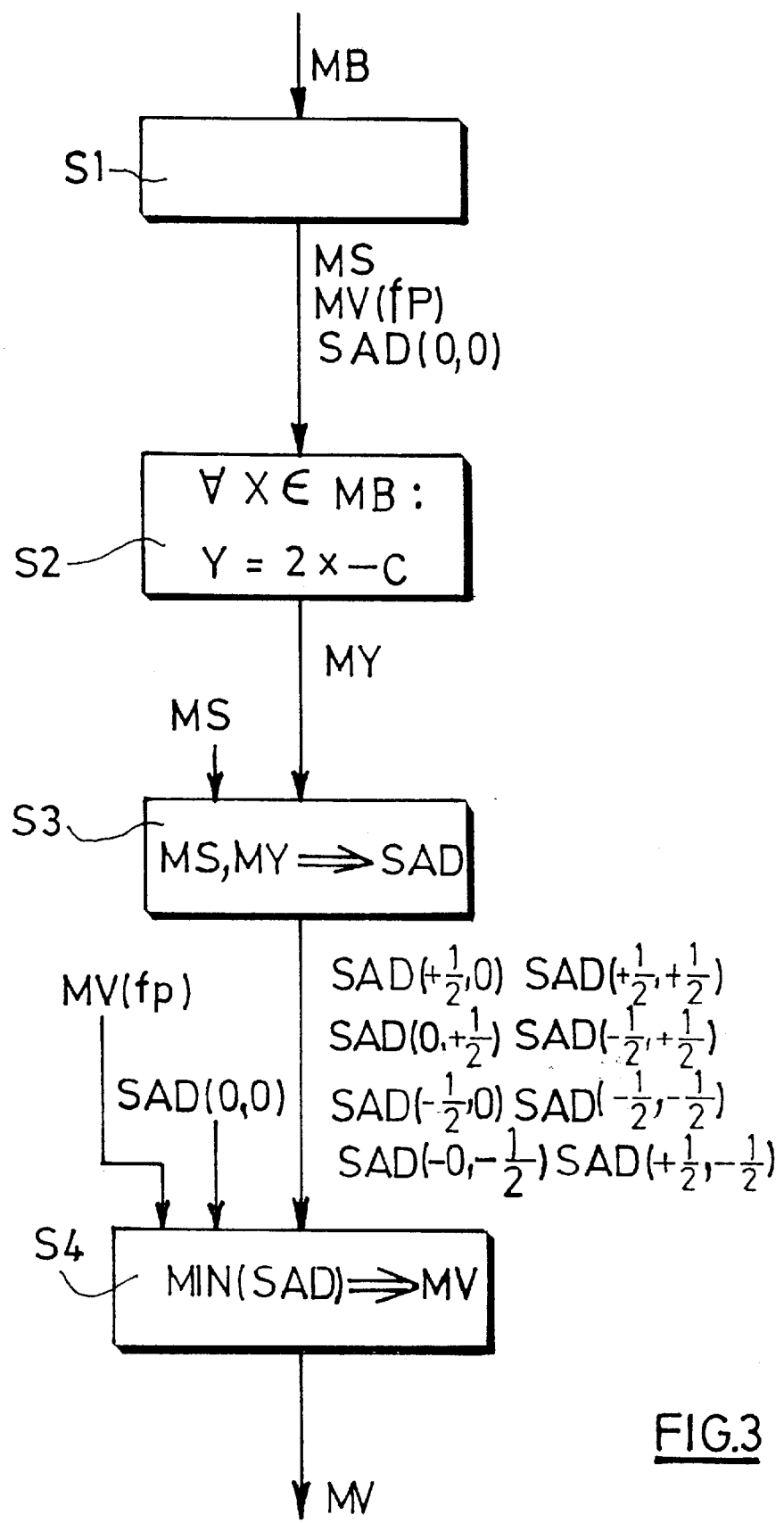
FIG. 3 is a flow chart illustrating a method of operation of the motion estimator.

FIG. 3 illustrates a method of operation of the motion estimator [MEST]. The motion estimator [MEST] determines a motion vector [MV] for a block of pixels [MB] to be encoded.

In step S1 the motion estimator [MEST] carries out standard motion estimation with full pixel precision. In effect, the motion estimator [MEST] carries out a search to find, in the picture that has been stored in the memory [MEM], a block of pixels that is similar to the block of pixels [MB] to be encoded. The latter block will be called similar block [MS] hereinafter. The blocks may have different positions in the respective pictures. A difference in position is specified by a full-pixel motion vector [MV(fp)]. The degree of resemblance between the respective blocks of pixels is expressed by a sum of absolute differences (SAD). The SAD is the sum of the absolute differences between pixels having the same position in the respective blocks.

In step S2 the motion estimator [MEST] carries out the following calculation for each pixel [X] in the block [MB] to be encoded. The pixel [X] is multiplied by two. The pixel [C] in the similar block [MS] that has the same position as the pixel concerned [X] in the block [MB] to be encoded is subtracted from the result of this multiplication [2X]. The result of this subtraction [2X−C] is called a common portion [Y] hereinafter. Thus, the motion estimator [MEST] calculates a common portion [Y] for each pixel [X] in the block [MB] to be encoded. Accordingly a block of common portions [MY] is obtained.

In step S3 the motion estimator [MEST] calculates an SAD for each of 8 possible half-pixel refinements of the full-pixel motion vector [MV(pf)]:(+½,0), (−½,+½), (0,+½), (+½,½),(−½, 0), (−½,−½), (0,−½) and (+½,−½). The number before and after the comma represents a refinement in the horizontal and vertical dimension, respectively. The respective SADs are all calculated in the same manner on the basis of the block of common portions [MY] and the similar block [MS] with its adjacent pixels. This calculation will be described hereinafter.

An SAD for a half-pixel refinement of the full-pixel motion vector [MV(fp)] is, in effect, an SAD that would be obtained if the following three steps were applied for each pixel [X] in the block [MB] to be encoded. In a first step an interpolation [I] is made of, on the one hand, the pixel [C] in the similar block [MS] that has the same position as the pixel [X] in the block to be encoded [MB] and, on the other hand, a neighboring pixel [B] in a certain direction. The direction is defined by the half-pixel refinement in question. For example, let it be assumed that the half-pixel refinement in question is (+½,+½). In that case, the interpolation [I] concerns the upper-right neighbor of the pixel [C] in the similar block [MS]. In a second step the absolute difference between the pixel [X] in the block [MB] to be encoded and the interpolation [I] is calculated. In a third step the absolute difference is added to a sum of absolute differences that have already been calculated for other pixels [X] in the block [MB] to be encoded. However, in accordance with the invention, the SADs for the half-pixel refinements are calculated in a different manner that will be described hereinafter.

In step S4 the motion estimator [MEST] compares the various different SADs: the SAD relating to the full-pixel motion vector [MV(fp)] and the 8 SADs relating to the 8 different half-pixel refinements of this motion vector. The SAD that is related to the full-pixel motion vector [MV(fp)] may have the lowest value. In that case, the motion estimator [MEST] will provide this motion vector as the motion vector [MV] that will serve for motion compensation. However, it is possible that an SAD relating to a certain half-pixel refinement has the lowest value. In that case, the motion estimator [MEST] will modify the full-pixel motion vector [MV(fp)] in accordance with the relevant half-pixel refinement. For example, let it be assumed that the half-pixel refinement (+½,+½) provides the lowest SAD. In that case, the full-pixel motion vector [MV(fp)] will be modified by adding positive half-pixel units to the full-pixel motion vector in the horizontal and the vertical dimension. The motion estimator [MEST] will then provide the modified full-pixel motion vector as the motion vector [MV] that will serve for motion compensation.

Figure 4:
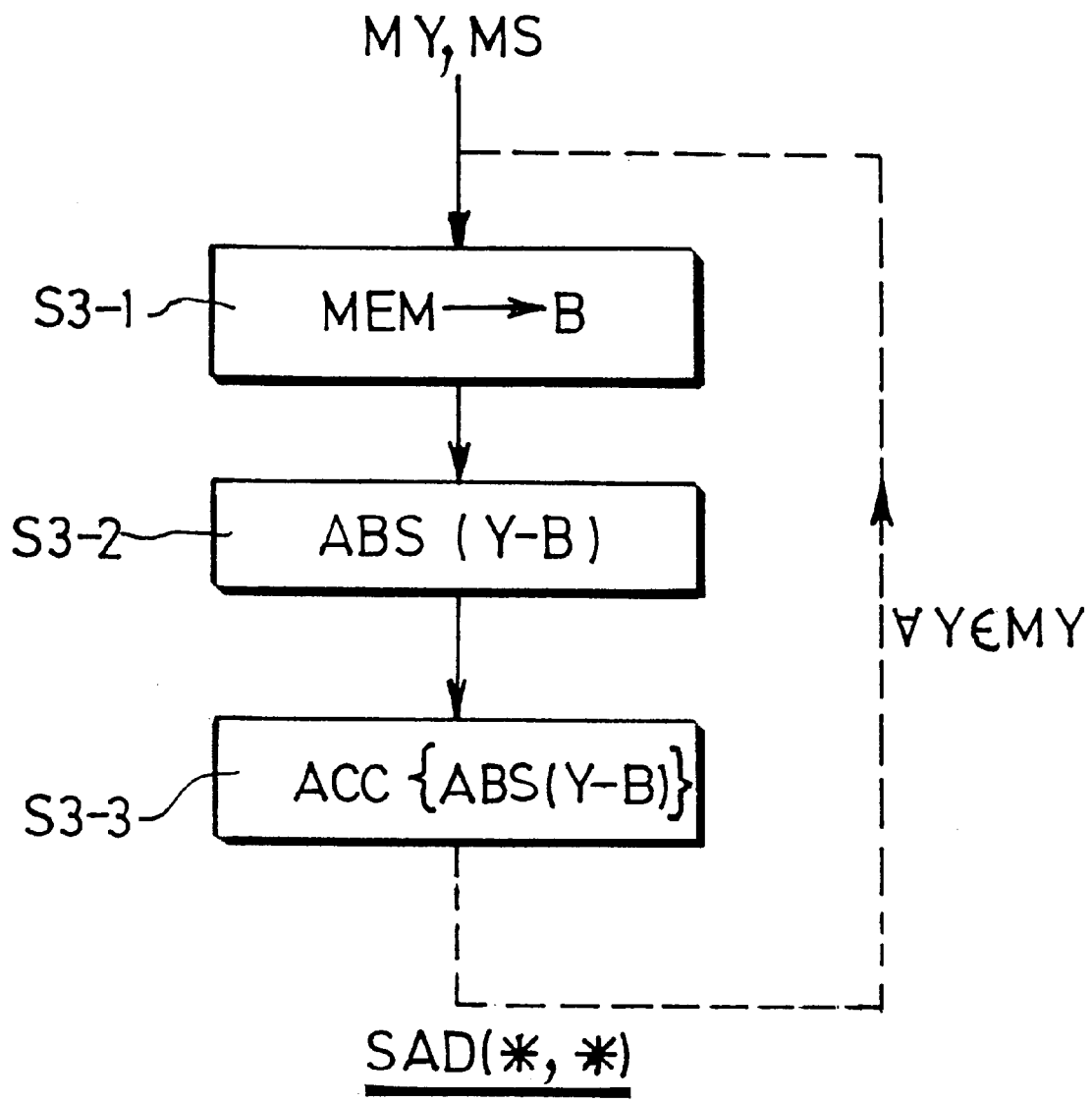
FIG. 4 is a flow chart illustrating details of the method of operation illustrated in FIG. 3.

FIG. 4 illustrates how an SAD for a half-pixel refinement is calculated. This calculation is carried out in step S3 of the method illustrated in FIG. 3. It has already been mentioned that an SAD for a half-pixel refinement is calculated on the basis of the block of common portions [MY], which has been determined in step S2, and the similar block [MS] and its adjacent pixels.

The SAD calculation for a half-pixel refinement comprises three substeps: S3-1, S3-2 and S3-3. The motion estimator [MEST] carries out these three sub-steps for each common portion [Y] in the block of common portions [MY].

In sub-step S3-1 the motion estimator [MEST] reads a pixel [B] that is stored in the memory [MEM]. The pixel [B] that is read is a neighbor of the pixel [C] in the similar block [MS] whose position corresponds to that of the relevant common portion [Y]. There are 8 possible neighbors in eight different directions: (+1,0), (+1,+1), (0,+1), (−1,+1), (−1,0), (−1,−1), (0,−1) and (+1,−1). The neighbor in the direction that corresponds to the half-pixel refinement is read. For example, let it be assumed that the SAD calculation is made for a half-pixel refinement (+½,0). In that case, the neighbor in the direction (+1,0) is read. To complete this example, let it be assumed that the position of the current common portion [Y] is (5,5). In that case, the motion estimator [MEST] will read the pixel [B] that has the position (6,5) in the similar block [MS].

In sub-step S3-2 the motion estimator [MEST] determines the absolute difference [ABS(Y−B)] between the common portion [Y] and the pixel [B], which it has read from the memory [MEM]. The absolute difference [ABS(Y−B)] is equal to a scaling factor multiplied by the absolute difference between, on the one hand, the pixel [X] in the block [MB] to be encoded that was used to calculate the common portion [Y] and, on the other hand, an interpolation of two pixels in the memory [MEM]. The interpolation concerns the pixel [C] in the similar block [MS] whose position corresponds to that of the pixel [X] in the block to be encoded, and the pixel [B] that is the neighbor, in the direction of interest, of this pixel [C] in the similar block. The scaling factor is two.

In sub-step S3-3 the motion estimator [MEST] adds the absolute difference [ABS(Y−B)], which it has determined in the most recent sub-step S3-2, to an accumulation of absolute differences [ACC(ABS(Y−B))]. The accumulation of absolute differences [ACC(ABS(Y−B))] is the sum of the absolute differences which have been determined in the sub-steps S3-2 preceding the most recent sub-step S3-2. It goes without saying that the accumulation of absolute differences [ACC(ABS(Y−B))] is initially set to zero before the three sub-steps S3-1, S3-2 and S3-3 are repetitively carried out in order to calculate an SAD for a certain half-pixel refinement.

When the three sub-steps S3-1, S3-2 and S3-3 have been carried out for all common portions [Y], the accumulation of absolute differences [ACC(ABS(Y−B))] is divided by two. The result of this division is the SAD for the relevant half-pixel refinement.

The operations that are carried out in the three sub-steps S3-1, S3-2 and S3-3 may also be used to carry out a full-pixel motion estimation. A full-pixel motion estimation is done in step S1 of the method illustrated in FIG. 1. Consequently, it is possible to carry out steps S1 and S3, which includes the sub-steps S3-1, S3-2 and S3-3, with the same items of hardware or software. This commonality further contributes to cost-efficiency.

The MPEG video encoder illustrated in FIG. 2, whose operation is illustrated in FIGS. 3 and 4, is an example of an implementation that has the features illustrated in FIG. 1. The weighting factors W1, W2 illustrated in FIG. 1 are both 0.5 in the MPEG video encoder. The preliminary calculation step [PCS] illustrated in FIG. 1 is implemented in the form of step S2 illustrated in FIG. 3. Since the weighting factors are both 0.5, the common portion [Y] that is calculated is: Y=2X−C. The further calculation step [FCS] illustrated in FIG. 1 is implemented in the form of step S3 illustrated in FIG. 3.

More specifically, the MPEG video encoder applies the features illustrated in FIG. 1 for each pixel [X] in a block of pixels [MB] to be encoded. In step S2, the MPEG video encoder carries out the preliminary step [PCS] for each pixel [X]. Subsequently, in step S3, the MPEG video encoder carries out the further calculation steps [FCS] that go with these preliminary steps [PCS]. The further calculation step [FCS] for a pixel [X] involves the 8 different SAD calculations. In each SAD calculation the MPEG video encoder calculates a difference between the common portion [Y] that has been determined for the pixel [X] and a neighbor [B] of the pixel [C] in the similar block [MS] whose position corresponds to that of the pixel [X] in the block to be encoded [MB].

The drawings and their description hereinbefore illustrate rather than limit the invention. It will be evident that there are numerous alternatives which fall within the scope of the appended claims. In this respect, the following closing remarks are made.

There will be many data-processing applications in which the features illustrated in FIG. 1 may be used. FIGS. 2-4 illustrate only one possible application that concerns video encoding. It will be appreciated that the features illustrated in FIG. 1 may be used in any type of data processing that requires an investigation of the degree of resemblance between a data sample and interpolations of other data samples.

There are numerous different types of interpolations that can be made. FIGS. 2-4 illustrate only one possible implementation in which the weighting factors W1, W2 for both samples are 0.5. Another possible implementation is, for example, that weighting factors W1 and W2 are ¾ and ¼, respectively. In that case, the common portion would be as follows: Y=4X−3C. Such an implementation may be applied, for example, to carry out a quarter-pixel motion estimation. The method illustrated in FIG. 4 may be applied to calculate an SAD. The accumulation of absolute differences [ACC(ABS(Y−B))] should then be divided by four.

There are various manners to calculate SADs in accordance with the invention. FIGS. 2-4 illustrates only one possible implementation in which SADs are calculated separately, one after the other. Another possible implementation is that various SADs are calculated simultaneously, in parallel. For example, the following steps can be carried out successively for each common portion [Y]. In a first step various neighboring pixels [B] belonging to the relevant common portion [Y] are read. In a second step the absolute difference [ABS(Y−B)] with each neighboring pixel [B] is determined. Each absolute difference concerns a different SAD calculation. In a third step each absolute difference is added to a sum of previously calculated absolute differences that concern the same SAD calculation. Thus, in contrast with step S3-3, there are various accumulations of absolute differences in parallel, each accumulation relating to a different SAD.

There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that a combination of items of hardware and/or software carries out a function.

For example, the motion estimator [MEST] of the MPEG video encoder illustrated in FIG. 2 can take the form of a processor that is capable of carrying out various functions. A set of instructions loaded into a program memory causes the processor to carry out the method illustrated in FIGS. 3 and 4. Another set of instructions may be loaded into the program memory so as to cause the processor to carry out, for example, a motion compensation. The set of instructions that causes the processor to carry out the method illustrated in FIGS. 3 and 4 may be stored on a data carrier such as, for example, a disk. This data carrier need not form part of the MPEG video encoder illustrated in FIG. 2. The set of instructions can be read from the data carrier in order to be loaded into the program memory of the processor, which will then fulfill the role of motion estimator [MEST].

Any reference sign in a claim should not be construed as limiting the claim. The verb "to comprise" does not exclude the use of any other elements or steps than those defined in a claim. The indefinite article "a" or "an" preceding an element or step does not exclude the use of a plurality of such elements or steps.

What is claimed is:

1. A data-processing method in which the degree of resemblance between a data sample [X] and interpolations [I] between another data sample [C] and further data samples [B] is determined for each interpolation [I], the interpolations [I] being the sum of the other data sample [C] multiplied by a first weighting factor [W1] and a further data sample [B] multiplied by a second weighting factor [W2] (I=C×W1+B×W2), characterized in that the method comprises:

a preliminary calculation step [PCS] in which a common portion [Y] is calculated, the common portion [Y] being the inverse of the second weighting factor [W2] multiplied by the difference between the data sample [X] and the other data sample [C] multiplied by the first weighting factor [W1] (Y=1/W2×{X−C×W1}); and a further calculation step [FCS] in which differences [ER] are calculated between the common portion [Y] and the respective further data samples [B], (ER=Y−B) each difference [ER] corresponding to the degree of resemblance between the data sample [X] and the relevant interpolation [I].

2. A data-processing arrangement for determining the degree of resemblance between a data sample [X] and interpolations [I] between another data sample [C] and further data samples [B] for each interpolation [I], the interpolations [I] being the sum of the other data sample [C] multiplied by a first weighting factor [W1] and a further data sample [B] multiplied by a second weighting factor [W2] (I=C×W1+B×W2), characterized in that the data-processing arrangement is programmed to carry out the following steps:

a preliminary calculation step [PCS] in which a common portion [Y] is calculated, the common portion [Y] being the inverse of the second weighting factor [W2] multiplied by the difference between the data sample [X] and the other data sample [C] multiplied by the first weighting factor [W1] (Y=1/W2×{X−C×W1}); and a further calculation step [FCS] in which differences [ER] are calculated between the common portion [Y] and the respective further data samples [B], (ER=Y−B) each difference [ER] corresponding to the degree of resemblance between the data sample [X] and the relevant interpolation [I].

3. A computer program product for a data processor, the computer program product comprising a set of instructions which, when loaded into a program memory of the data processor, causes the data processor to determine the degree of resemblance between a data sample [X] and interpolations [I] between another data sample [C] and further data samples [B] for each interpolation [I], the interpolations [I] being the sum of the other data sample [C] multiplied by a first weighting factor [W1] and a further data sample [B] multiplied by a second weighting factor [W2] (I=C×W1+B×W2), the degree of resemblance being determined in accordance with the following steps:

a preliminary calculation step [PCS] in which a common portion [Y] is calculated, the common portion [Y] being the inverse of the second weighting factor [W2] multiplied by the difference between the data sample [X] and the other data sample [C] multiplied by the first weighting factor [W1] (Y=1/W2×{X−C×W1}); and a further calculation step [FCS] in which differences [ER] are calculated between the common portion [Y] and the respective further data samples [B], (ER=Y−B) each difference [ER] corresponding to the degree of resemblance between the data sample [X] and the relevant interpolation [I].

4. A method of video encoding in which the degree of resemblance between a pixel [X] and interpolations [I] between another pixel [C] and further pixels [B] is determined for each interpolation [I], the interpolations [I] being the sum of the other pixel [C] multiplied by a first weighting factor [W1] and a further pixel [B] multiplied by a second weighting factor [W2] (I=C×W1+B×W2), characterized in that the method comprises:

a preliminary calculation step [PCS] in which a common portion [Y] is calculated, the common portion [Y] being the inverse of the second weighting factor [W2] multiplied by the difference between the pixel [X] and the other pixel [C] multiplied by the first weighting factor [W1] (Y=1/W2×{X−C×W1}); and a further calculation step [FCS] in which differences [ER] are calculated between the common portion [Y] and the respective further pixels [B], (ER=Y−B) each difference [ER] corresponding to the degree of resemblance between the pixel [X] and the relevant interpolation [I].

\* \* \* \* \*